United States Patent [19]

Blaylock

[11] 3,961,174

[45] June 1, 1976

[54] WARNING LIGHT APPARATUS FOR INDUSTRIAL VEHICLE USE

[75] Inventor: Arnold O. Blaylock, Fort Worth, Tex.

[73] Assignee: Lectric Lite Company, Fort Worth, Tex.

[22] Filed: June 9, 1975

[21] Appl. No.: 585,089

[52] U.S. Cl. ............................ 240/8.18; 240/7.35; 240/73 DA
[51] Int. Cl.² ...................... B60Q 1/26; B60Q 3/02; F21S 1/02
[58] Field of Search .................. 240/7.1, 7.35, 8.18, 240/73 DA

[56] References Cited
UNITED STATES PATENTS 2,678,381   5/1954   Schwartz........................ 240/7.35 X
3,156,415   11/1964   Walker ............................ 240/7.35

FOREIGN PATENTS OR APPLICATIONS 1,383,653   2/1975   United Kingdom............ 240/10.6 R Primary Examiner—George H. Miller, Jr.

[57] ABSTRACT

Disclosed herein is a warning light characterized by a flashing strobe light enclosed in a lens, particularly constructed for use on industrial vehicles. The apparatus comprises a solid integral base having a flange for direct coupling to the industrial vehicle. A cylindrical sidewall is integrally formed with the base, and provides a support for the lens. The lens is annular shaped and has a metal plate mounted on top.

5 Claims, 3 Drawing Figures

U.S. Patent  June 1, 1976  3,961,174
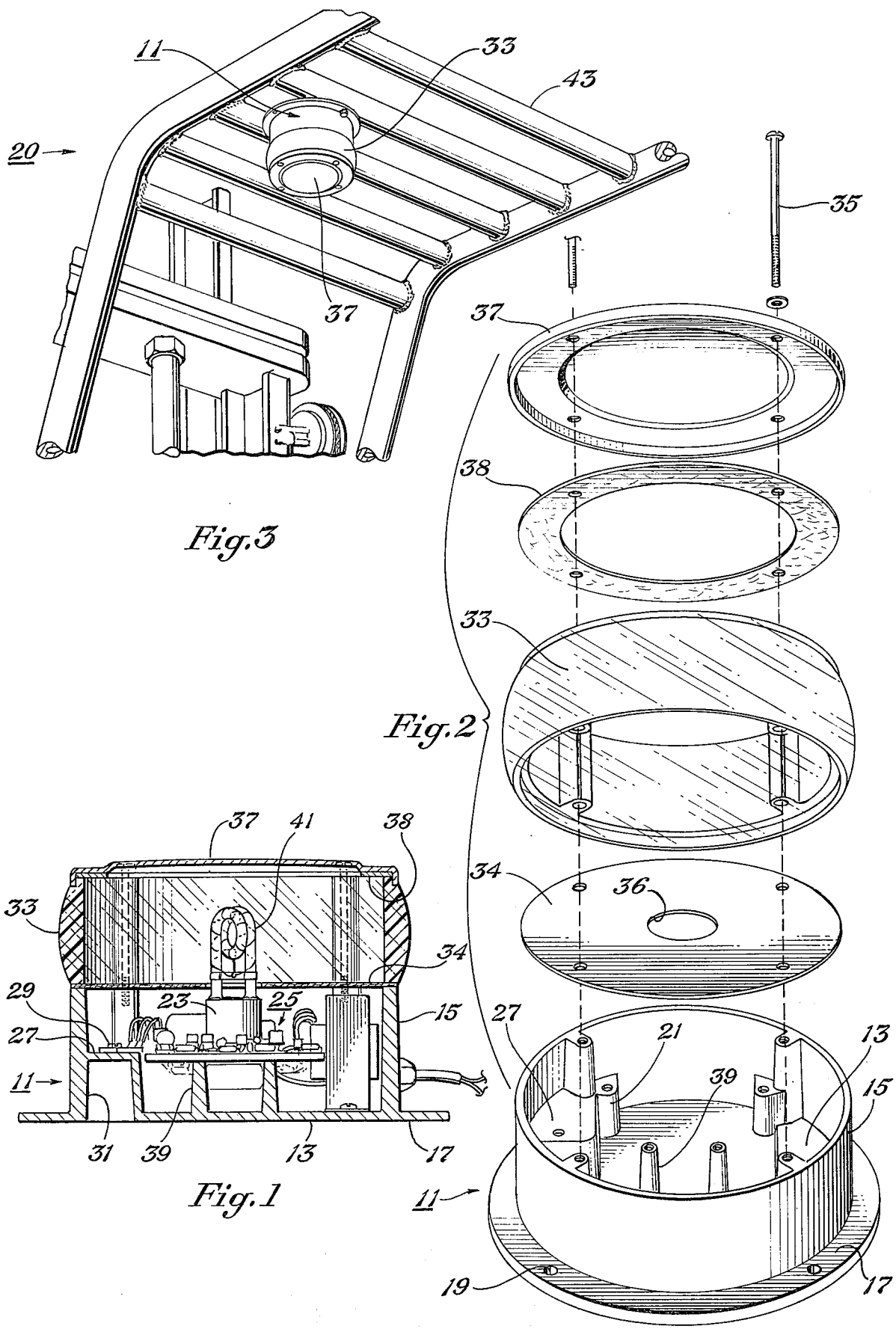

WARNING LIGHT APPARATUS FOR INDUSTRIAL VEHICLE USE

BACKGROUND OF THE INVENTION

1. Field of the Invention

This invention relates in general to emergency or warning lights, and in particular to intermittently operated strobe lights that are especially adapted for industrial vehicle use.

2. Description of the Prior Art

Previously intermittently flashing warning lights have been available for uses such as police cars, emergency vehicles, and warning barricades. One type, generally identified as a strobe light, utilizes a bulb that is intermittently actuated by a circuit utilizing solid state components. The prior art device normally includes a domed lens enclosing the bulb, and a metal sleeve to support the lens and serve as a coupling means to attach to the vehicle. As shown in my patent U.S. Pat. No. 3,731,082, issued May 8, 1973, these devices may incorporate a base plate also that fits within the sleeve.

While these warning lights are successful for their purposes, problems are encountered when they are used with industrial vehicles. Unlike emergency vehicles such as ambulances, police cars, and the like, the industrial vehicles referred to herein, such as forklifts, are normally unsprung because of heavy loads carried. Consequently, the industrial vehicle frame is subjected to vibrations and shocks which normal emergency vehicles attenuate through springs and shock absorbers.

These vibrations are highly detrimental to the circuitry, bulbs, and other components of the warning lights. Rigid coupling of conventional flashing lights to the vehicle frequently resulted in early malfunction because of the vibrations. Often the solution in the past has been to place a rubber cushion between the warning light and the industrial vehicle.

Applicant has discovered that the rubber cushion does not satisfactorily attenuate the vibrations and shocks. Furthermore, conventional warning lights, if placed on top of the industrial vehicle, may be easily broken by falling objects. If mounted below the protective frame, with the dome downward, the flashing light transmitted vertically interferes with the operator's vision.

SUMMARY OF THE INVENTION

It is accordingly a general object of this invention to provide an improved warning light particularly adapted for use on industrial vehicles.

It is a further object of this invention to provide a warning light that will withstand vibrations and shocks, designed for direct rigid coupling to the frame of an industrial vehicle.

Another object is to provide a warning light sufficiently strong to withstand impacts from falling objects if mounted on top of the industrial vehicle and designed to prevent interference with the operator's vision if mounted downward.

These and other objects, as well as advantages, of this invention will become apparent in the following.

BRIEF DESCRIPTION OF THE DRAWING

FIG. 1 is a vertical cross-sectional view of a warning light apparatus employing the principles of this invention.

FIG. 2 is an exploded perspective view of the warning light apparatus of FIG. 1 with the circuit board and lamp removed.

FIG. 3 is a perspective view of the warning light apparatus of FIG. 1 and a partial view of a forklift, with the warning light shown installed on the protective frame of the forklift.

DESCRIPTION OF THE PREFERRED EMBODIMENT

The warning light apparatus shown in the figures includes a base 11 having a circular bottom plate 13 and a cylindrical sidewall 15. The sidewall 15 is of slightly less diameter than the plate 13, thereby forming a flange 17 about the perimeter of bottom plate 13. A plurality of holes 19 about flange 17 receive bolts (not shown) for direct coupling of base 11 to an industrial vehicle 20.

A plurality of projections or mounting brackets 21 extend from the bottom plate 13 and are enclosed by sidewall 15. The mounting brackets 21 are selectively spaced about the inner wall of sidewall 15 and bottom plate 13 and serve as means for mounting a strobe light 23 and circuit means 25. One portion of the mounting means comprises a shoulder or step 27 extending from the inner wall of sidewall 15 to bottom plate 13. Step 27 serves as a mounting bracket and heat sink for a power transistor 29. In order to prevent shrinkage during casting, step 27 is hollow as indicated at 31. Bottom plate 13, sidewall 15, flange 17 and the mounting means are all cast in a solid integral piece, preferably aluminum or aluminum alloy.

A lens 33 is supported on top of sidewall 15 by means of screws 35. Lens 33 is open topped and of annular configuration. The lens is constructed of a translucent, sometimes transparent material, such as clear plastic, to which a suitable dye is added during construction to provide the selected lens color. The exterior of lens 33 is convex and smooth. A circular gasket 34 having a hole 36 for the insertion of strobe light 23 is inserted between lens 33 and sidewall 15 for waterproofing.

An opaque top plate 37 is attached to the top of lens 33 by means of screws 35. Top plate 37 is substantially flat, circular and preferably of metal, such as aluminum or aluminum alloy. An annular gasket 38 is inserted between top plate 37 and lens 33 for waterproofing.

As seen in FIGS. 1 and 2 extending upwardly from the bottom plate 13 are two mounting brackets or pedestals 39 that are part of the mounting means and support strobe light 23. Strobe light 23 may be of any type of high intensity lamp that intermittently flashes and is preferably a "Xenon" bulb. Such bulbs when energized with a suitable quantity of electrical energy create light through the process of ionizing the xenon gas inside a transparent or translucent tube 41.

Circuit means 25 transmits electrical energy to strobe light 23 by utilizing solid state circuitry that includes power transistor 27. As taught in my aforementioned patent, heat generated by the power transistor 29 may cause damage to the circuitry. Thus transistor 29 is directly coupled to step 27 so that its heat may be transferred to the base 11 and dissipated.

The remainder of circuit means 25 is mounted on a printed circuit board, which in turn is directly coupled to brackets or projections 21 of the mounting means. The total heighth of the warning lamp is approximately 4–5 inches, with the bottom plate 13 being approximately ¼ inch thick, and sidewalls ⅛ inch thick. The total weight is approximately 5 pounds.

FIG. 3 shows a portion of an industrial vehicle or forklift 20. Frame 43 extends above the operator (not shown) for protection from falling objects. The warning light is designed to be mounted directly to frame 43 without any intermediate rubber gasket, by bolting flange 17 to the frame through holes 19. The warning light may be utilized in at least two positions. The position shown is with the top or top plate 37 facing downward from frame 43. In this position the lamp is protected from any falling objects or low clearances. Because of its relatively short heighth, there is no interference with the operator. The metal plate 37 directs the emitting light horizontally, thus shielding the operator from the flashing light while the operator is looking rearward.

Another position (not shown) is with the warning lamp facing upward from frame 43. In this position, the relatively low heighth of the lamp prevents normal clearance problems. The metal top plate 37 provides a measure of protection from falling objects and directs the flashing light horizontally.

Other types of rigid connections may be employed such as by screwing strong magnets to base 11, and attaching the lamp to frame 43 through the magnetic force.

Vibration tests have been conducted with a warning light constructed in accordance with this invention. One test utilized a sponge rubber pad for mounting. Another utilized four short cylindrical rubber mounts, while the third utilized rigid coupling or hard mounting. Vibration amplitudes for various frequencies were recorded from a transducer mounted to the warning light. Hard mounting resulted in the lowest amplitudes with no resonances observed. The other two had appreciable resonances in either the horizontal or vertical axis or both. Also while hard mounted, the warning light was subjected to strenous shock tests and did not malfunction.

It should be apparent from the foregoing that an invention having significant advantages has been provided. Rather than utilize a conventional warning light with various types of cushions to alleviate vibrations, this invention teaches to the contrary that directly coupling the light to the vibrating frame of the industrial vehicle is more satisfactory if the lamp is designed in accordance with the teachings of this invention. Utilizing a base that has circuit and lamp mounting means, support for the lens, and means for mounting the lamp to the vehicles, formed integrally into a solid, relatively heavy piece minimizes vibrations and potential vibration problems. Further advantages for industrial vehicle use are provided by the annular lens and metal top plate rather than the conventional dome; these features provide a warning light protected from falling objects as well as serving to direct the light outward. Moreover the metal plate allows the strobe light to be placed near the top without any detriments from heat generated by the strobe light, allowing a low heighth.

While this invention has been shown in only one of its forms, it should be apparent to those skilled in the art that it is not so limited but is susceptible to various changes and modifications without departing from the spirit thereof.

I claim:

1. An improved warning light apparatus for industrial vehicle use having an intermittently flashing high intensity light and circuit means enclosed within a lens, the improvement comprising:
   a transverse bottom plate;
   a sidewall extending from the plate, for providing a support for the lens;
   an annular flange adjacent the sidewall and plate for direct rigid coupling to the industrial vehicle; and
   mounting means extending from the plate for mounting the high intensity light and circuit means;
   said bottom plate, sidewall, mounting means and annular flange being formed in a solid integral piece.

2. The invention according to claim 1 wherein the sidewall is cylindrical.

3. The invention according to claim 1 wherein the mounting means comprises a plurality of projections extending from the base.

4. The invention according to claim 1 wherein the bottom plate, sidewall, annular flange, and mounting means are constructed substantially of aluminum.

5. An improved warning light apparatus for industrial vehicle use having an intermittently flashing high intensity light and circuit means enclosed within a lens, the improvement comprising:
   a transverse bottom plate having an annular flange for direct coupling to the industrial vehicle;
   a cylindrical sidewall located inwardly from the flange and extending from the plate for providing a support for the lens;
   a plurality of projections extending from the base for mounting the high intensity light and circuit means;
   said bottom plate, flange, sidewall and projections being formed in a solid integral piece;
   an annular shaped lens mounted to the sidewall; and
   a circular metal plate mounted to the top of the lens.

* * * * *